United States Patent
Hastman

(10) Patent No.: US 9,378,481 B2
(45) Date of Patent: Jun. 28, 2016

(54) SYSTEM AND METHODS FOR INVENTORY MANAGEMENT OF DATA CENTER EQUIPMENT CONTAINED IN SERVER RACKS

(71) Applicant: Level 3 Communications, LLC, Broomfield, CO (US)

(72) Inventor: James Conrad Hastman, Aurora, CO (US)

(73) Assignee: Level 3 Communications, LLC, Broomfield, CO (US)

(*) Notice: Subject to any disclaimer, the term of this patent is extended or adjusted under 35 U.S.C. 154(b) by 48 days.

(21) Appl. No.: 14/021,875

(22) Filed: Sep. 9, 2013

(65) Prior Publication Data
US 2015/0069119 A1    Mar. 12, 2015

(51) Int. Cl.
G06F 19/00 (2011.01)
G06Q 90/00 (2006.01)
G06Q 10/08 (2012.01)

(52) U.S. Cl.
CPC .................... *G06Q 10/087* (2013.01)

(58) Field of Classification Search
CPC ......... A01K 5/02; G06Q 20/14; G06Q 10/00; G06Q 10/087; G06Q 10/08; H04L 67/36; G06F 17/30879; G06K 1/121; G06K 17/002
See application file for complete search history.

(56) References Cited

U.S. PATENT DOCUMENTS

| | | | |
|---|---|---|---|
| 7,108,188 B2 | 9/2006 | Hoshino | |
| 8,171,142 B2* | 5/2012 | Kolin et al. | 709/226 |
| 8,264,354 B2 | 9/2012 | Groth et al. | |
| 2005/0246436 A1 | 11/2005 | Day et al. | |
| 2012/0259745 A1* | 10/2012 | Kusada et al. | 705/28 |
| 2013/0026220 A1* | 1/2013 | Whelihan | 235/375 |
| 2013/0071029 A1* | 3/2013 | Terwilliger et al. | 382/183 |

OTHER PUBLICATIONS

International Search Report, dated Nov. 19, 2014, Int'l Appl. No. PCT/US14/054810, Int'l Filing Date Sep. 9, 2014; 3 pgs.
Written Opinion of the International Searching Authority, dated Nov. 19, 2014, Int'l Appl. No. PCT/US14/054810, Int'l Filing Date Sep. 9, 2014; 5 pgs.
International Preliminary Report on Patentability, dated Mar. 15, 2016, Int'l Appl. No. PCT/US14/054810, Int'l Filing Date Sep. 9, 2014; 7 pgs.

* cited by examiner

*Primary Examiner* — Thien T Mai

(57) ABSTRACT

Implementations described and claimed herein provide a system and method for inventory management of data center equipment contained in server racks. In one implementation, the system and method include generating an identifying code that includes location information, hardware specific information, and equipment history of the equipment to be managed. The ID code is applied to the equipment or a portion thereof. A code scanner or reader is positioned within scanning range of the ID code when the equipment is positioned in the server rack. The code reader scans for ID codes and communicates the information associated with the codes to a communication device, which communicates the codes to a user or network device in a network environment. The information may then be analyzed, sorted, and displayed in a graphical user interface such that a user may evaluate, locate, and track the equipment.

8 Claims, 10 Drawing Sheets

SYSTEM AND METHODS FOR INVENTORY MANAGEMENT OF DATA CENTER EQUIPMENT CONTAINED IN SERVER RACKS

TECHNICAL FIELD

Aspects of the present disclosure generally involve inventory management of data center equipment. More particularly, the invention relates to a system and methods for locating and tracking data center equipment (e.g., server) that is housed in server racks.

BACKGROUND

Accurately managing inventory in a data center environment is a difficult endeavor. One such challenge in managing data center inventory is that the equipment is constantly in flux. In a network environment, servers in a particular server rack are constantly being removed or replaced due to server maintenance, failure, and/or reconfiguration of the servers in the network. As servers require maintenance, data center technicians or engineers must remove servers and then return the server to the correct rack and, in some instances, the correct location in the rack. Similarly, when a server fails, personnel must find and replace the failed server. Locating a particular server for replacement can be difficult in a large data centers with rows of server racks because a technician must know where a server is located down to a specific slot in a particular server rack.

The challenge of locating a particular server can add to the cost of data center operations as well as contribute to overall inefficient management of data center inventory. For these reasons, among others, there is a need for inventory management systems and methods that track the location of moveable servers and other equipment that are contained in server racks within a data center.

It is with these issues in mind among others, that various aspects of the presently disclosed technology were developed.

SUMMARY

Implementations described and claimed herein address the foregoing problems by providing a system and methods for locating and tracking equipment contained in a server rack.

A system and method for inventory management in a data center are disclosed herein. In one implementation, the system and method include: a user device, such as a personal computer, that is in communication with a network; an identifying tag ("ID code"), which includes information pertaining to the equipment and its location in the data center, that is generated and placed on the equipment to be installed in a slot in the server rack; an optical reader or scanner that scans the identifying tag when the equipment is positioned in the designated slot in the server rack; and a communication device, such as a computer processing device, which receives scanned signal readings from at least one optical reader and communicates the information contained in the identifying tag through the network and to a network device. The system may further include a graphical user interface that the user device may interact with in order to signal the system to scan the server racks for ID codes.

In one embodiment, an identifying tag is generated by a computer program, printed on a printing device, and affixed to a portion of the equipment to be housed in the server rack. The equipment may be a computer processing device, such as a server. In the case of a server, the identifying tag may be placed on a rack ear, which couples the server to the server rack. The identifying tag may include information relating to a location of the equipment, such as the location of the equipment in a particular rack in the data center and the location of the equipment in a particular slot in the rack. The information may also include equipment specific information, such as a factory serial number of a particular server. The information may further include a history of the equipment as it relates to replacement and maintenance.

The system and method may be automated or may operate in response to command prompts from a user operating a user device. In either a manual or an automated embodiment of the system and method, a network or user device, such as a personal computer, may signal at least one optical reader, though the communication device, to scan its designated slot for an ID code. The optical reader correspondingly scans for an ID code and signals the communication device with information contained in the ID code. The communication device, in turn, communicates the information contained in the ID code to a network device for display, storage, or otherwise. The information contained in the ID code(s) may be processed and displayed in a graphical user interface that may be browsed by a user to locate and track the equipment in the data center.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Figure 1:
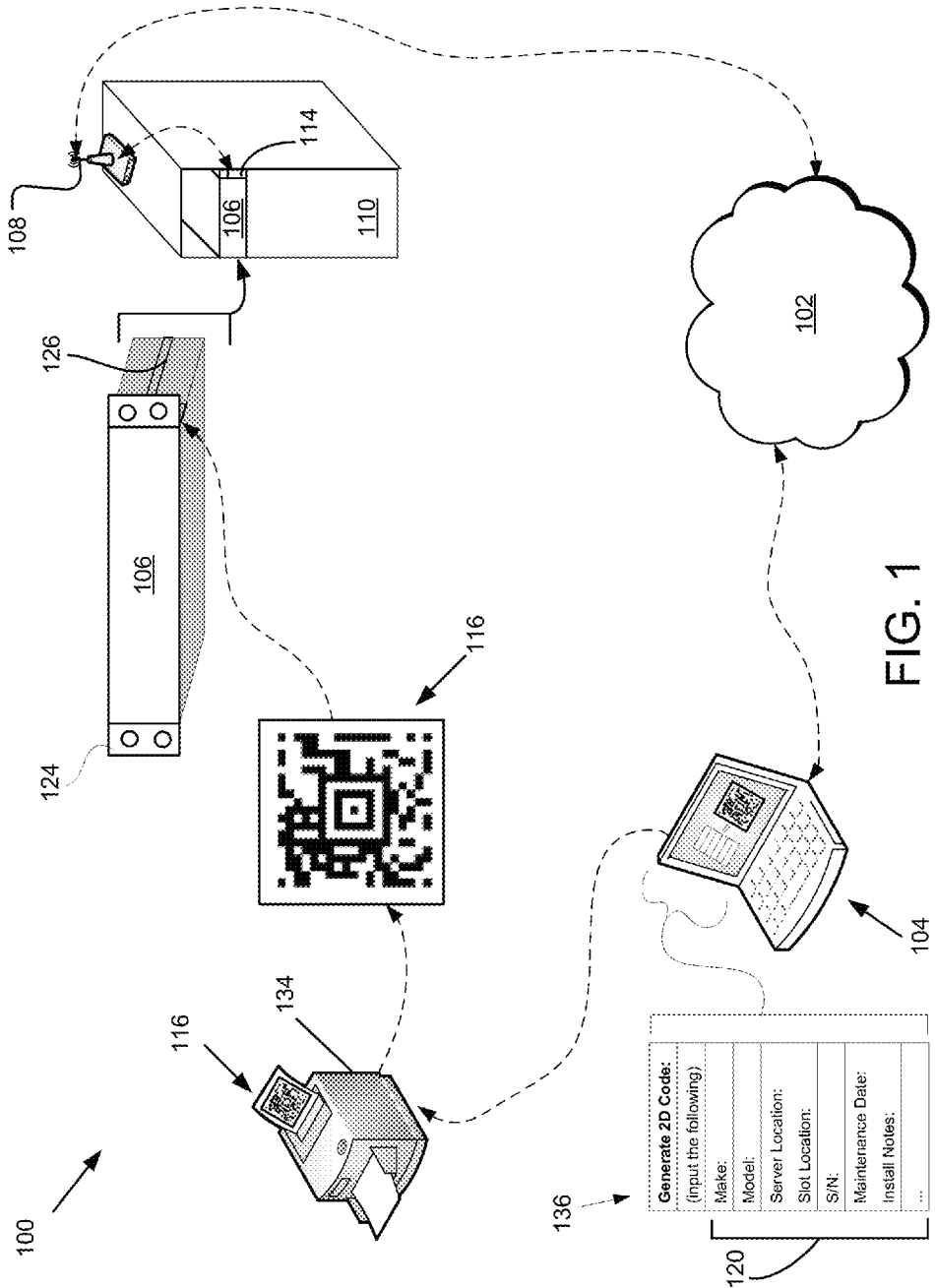
FIG. 1 illustrates an embodiment of the system and methods for locating and tracking data center equipment that is housed in server racks.

Aspects of the present disclosure involve management of inventory in a data center by generating an identifying tag or code that includes identifying information for equipment in the data center. The equipment may include servers, server appliances, computer processing devices, data storage equipment, or any other data center equipment that may be housed in a standard-size server rack or cabinet enclosure (e.g., 19 inch, 23 inch). The identifying information may include a location of a server within a particular server room, a location of the server within a particular slot in a server rack, a make and/or model of the server, and a factory serial number of the server, among other information. In a certain embodiment, the identifying code ("ID code") may be a matrix barcode, also known as a two dimensional barcode or 2D code. In another embodiment, the identifying tag may be a linear barcode. The ID code is printed on a sticker, magnet, paper product, or otherwise and is applied to a portion of the server, a portion of a mountable attachment of the server (e.g., server ears), or proximally of the server. The server is installed into the server rack at a slot location that is identified in the ID code, by sliding the rack mountable server on rails into the identified slot. If the server is not rack mountable, it can be placed in the rack or cabinet on a shelf or otherwise. Once the server is slid into the rack on the server rails, the server can be secured to the rack via server rack ears, which extend from sides of a face of the server.

The ID code is positioned on the server or the mountable attachment such that it is within range of an optical reader or scanner (e.g., code scanner, barcode scanner, optical scanner, smart device running interpretive software), or other suitable device capable of scanning an ID code, when the server is placed in the server rack. The optical reader may be mounted on an inside portion of the rack and positioned so that it is aligned with the ID code. Thus, in one embodiment, the server rack is configured with optical readers positioned to read the respective ID codes of servers placed in slots of the rack. The optical reader may be set to scan at predetermined times or upon receipt of a command in order to detect the ID code of the server in the slot. The scans from the optical reader may be configured to scan a single server slot, multiple server slots, or all server slots in a particular area of the data center. If an ID code of a server is detected, the reader may communicate the information from the ID code to another device. In one specific example, the device is a wireless communication device or computer processing device, which is communicably connected to the reader. The wireless communication device communicates with a network and sends the scanned information from the ID code through the network to another server, display device, storage device, and/or the like. A computer device that is connected to the network can then display the data from the ID code. Reports can then be run so as to display the identifying information for all servers within the data center. This information can then be sorted so that a clear and accurate picture of slotted data center inventory can be obtained. Moreover, various user interfaces may be used to interact with the server/rack/slot data.

Figure 2:
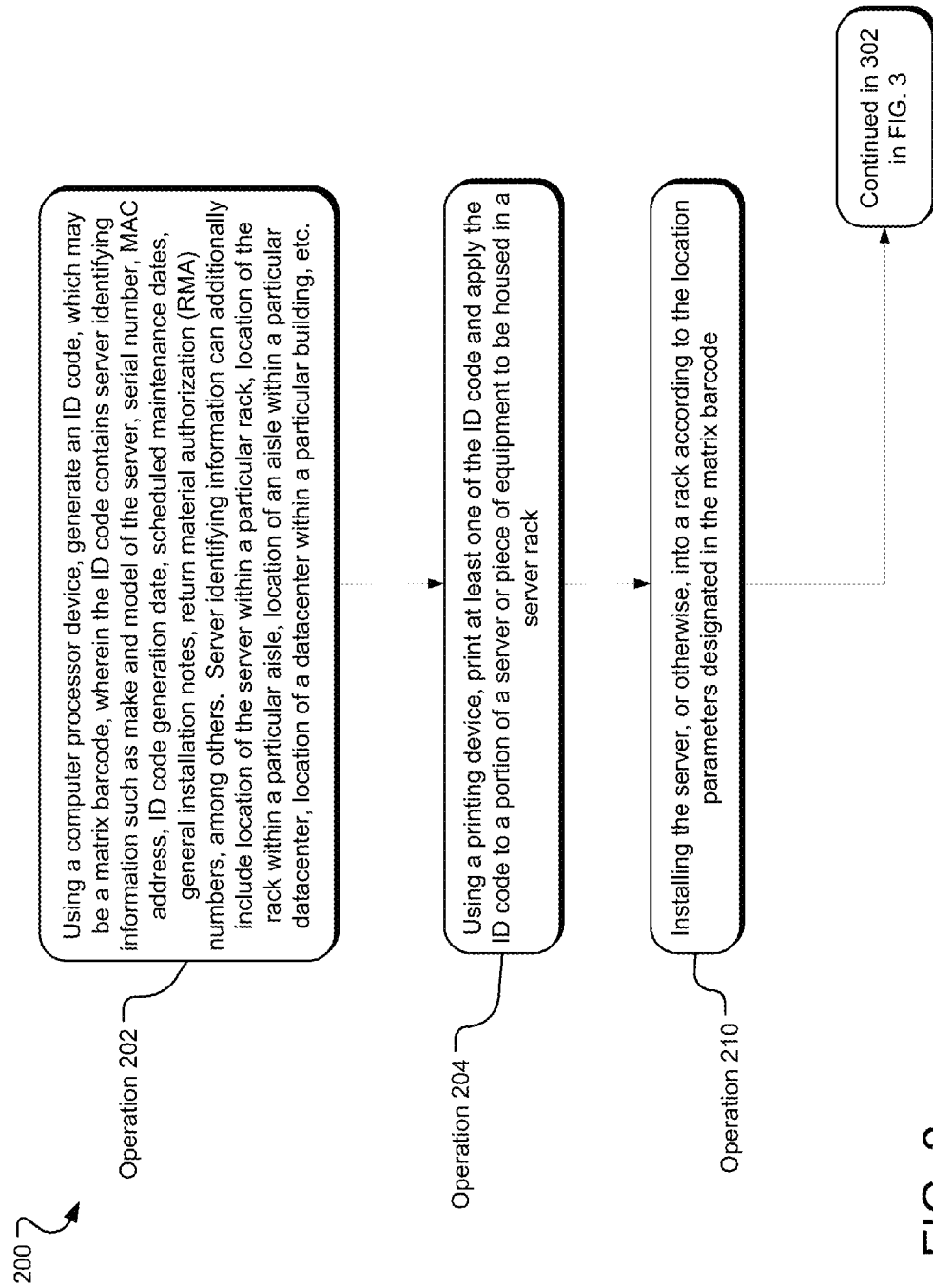
FIGS. 2-3 are flowcharts outlining a method for locating and tracking data center equipment that is housed in server racks.

Referring to FIGS. 1-2, a system 100 for locating and tracking equipment in a data center includes a user device 104, such as a computer or tablet PC, which generates an ID code 116 (operation 202). The generation of such codes 116 by a user device 104 generally entails a user entering server identifying information 120 through a graphical user interface 136 that is passed to a computer program that is configured to generate an ID code 116 that corresponds to the server identifying information 120 (operation 202). The server identifying information 120 may include the physical location of the server 106 with respect to a particular building, a server room, an aisle, a server rack 110, a slot within the rack, etc. In addition to the physical location of the server 106, information identifying each specific server 106 may be helpful to a data center worker in order to visually verify that a correct server 106 is being replaced. In a particular embodiment, information relating to each specific server 106 can include a make and a model of the server 106, a factory serial number, and a MAC address(es) (media access control), among others. Each server 106 usually includes a printed label with the factory serial number and possibly the MAC address, among other possible identifying numbers, printed on the label. In addition, each server 106 most likely includes make and model information either on the printed label or elsewhere on the server 106. With this information, a data center worker may proceed to locate a particular server 106 for replacement by referring to the location information (e.g., aisle, rack, slot) identified in the ID code and then the worker can visually verify, for example, the factory serial number of the particular server 106 in the slot before replacing the server 106.

Additional information relating to a server history may be included in the identifying information 120. The server history information can include a generation date of the ID code, an installation date, a maintenance date(s), an installation note(s), and a Return Material Authorization number(s) (i.e., refers to previous maintenance work performed typically by the manufacturer), among others. The server history may provide useful information in accessing a servers' expected life as well as identifying when servers 106 require maintenance. For example, a data center worker may run a report that identifies certain servers 106 that are due for maintenance and/or upgrade. The data center worker may proceed to locate the certain servers 106 by the location information (e.g., aisle, rack, slot) and verify the replacement of the certain servers 106 by the server specific information (e.g., serial number). Additionally, the data center worker may update the server identifiable information 120 by adding an RMA number and then generating a new ID code. Including the RMA number or other such server history information in the ID code 116 provides a history of the work performed on the server 106, which may be useful in troubleshooting and diagnosing problems with the servers 106. While reference is made to location information, server specific information, and server history information, the particular information contained in the ID code 116 can vary accordingly based on the needs of the particular data center or network environment. The factors included in the server identifiable information 120 listed previously are illustrative and not meant to be limiting.

Once all of the server identifiable information 120 is inputted into a computer program that is configured to generate a ID code 116, the computer program can generate the matrix barcode 116 and the code 116 can be stored on a user device 104, a server, a peripheral device, or otherwise so as to have copy or record of the ID code 116 and the corresponding information 120.

While 2D codes and linear barcodes 116 are discussed as a medium for identifying server information 120, other implementations are possible to accomplish the same function. For example, the system 100 may include radio-frequency identification, or RFID, as the ID code for locating and tracking equipment in a server rack. RFID "tags" use radio-frequency electromagnetic fields to wirelessly transfer data. Data contained on an RFID tag is read by a reader or interrogator, which is a two-way radio transmitter-receiver. In a particular embodiment with RFID as opposed to a 2D code, a computer processor would include an RFID read/write module to write server identifiable information 120 onto the RFID tag. An advantage to RFID tags compared with 2D codes 116 is that an RFID tag can be read if it is in the proximity of a reader 114, whereas a 2D code 116 requires a more precise scan by an optical reader 114 to read the code 116. The disclosure of the system 100 includes various embodiments utilizing 2D codes, linear barcodes, and RFID. The disclosure of the system 100 is not intended to be limited to a particular ID code 116, but is intended to encompass all such ID codes 116.

As a general note, the amount of information 120 contained in the ID code 116 is governed by the particular type of code 116 that is generated. For example, as depicted in FIG. 1, an Aztec Code has a maximum character limit of 3,800 when the input contains only numerical values. If the input contains alphanumeric characters (i.e., letters, numbers, symbols) then the character limit is 3,000. An option to avoid the character limit is to include a link to a network site (e.g., intranet site) on the ID code, wherein the network site contains information relating to the server 120 that is not limited by the character limit of the ID code 116.

Referring to FIGS. 1-2, once the ID code 116 is generated, the code 116 may be printed on a printing device 134 (operation 202-204). The printing device 134 may be connected directly to the computing device 104 in a personal area network (PAN), in a local access network (LAN), or otherwise. The code 116 may be printed on a piece of paper, a sticker, a magnet or any other suitable material that can be affixed to the server 106 or certain attachment pieces of the server. The attachment pieces may include rails 126 and server ears 124 that couple to the server 106 as well as an internal compartment within a server rack 110. Server racks 110 are generally a standard size of either 19 or 23 inches wide. The racks 110 include a plurality of internal slots 112 that are generally some multiple of a "rack unit" (e.g., 1 U is 1.75") in height.

Figure 4:
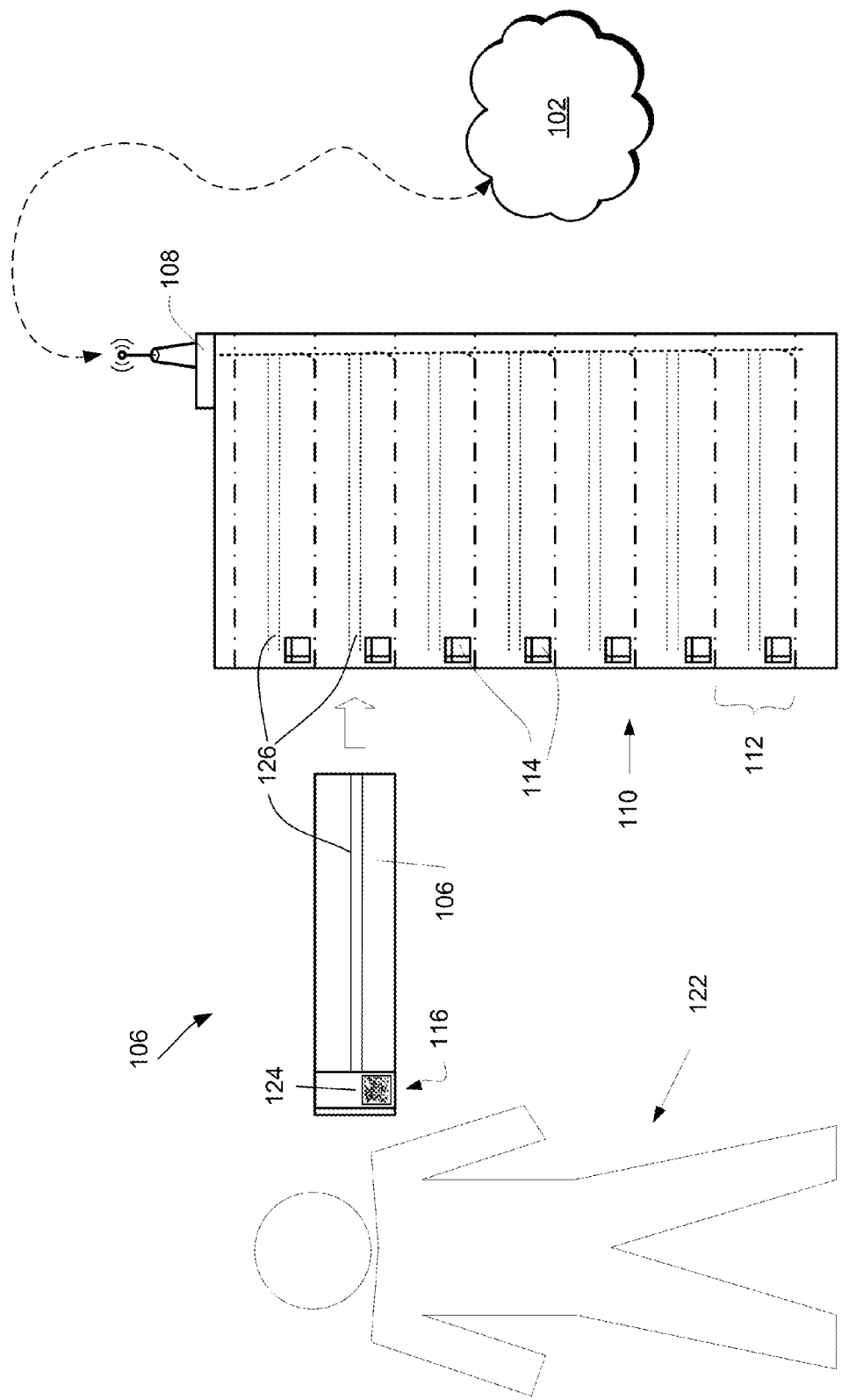
FIG. 4 illustrates a portion of the system and methods for locating and tracking data center equipment that is housed in server racks.

As depicted in FIG. 4, the rails 126 consist of a server rail that is affixed to sides of an outer housing of the server and a corresponding rack rail that is affixed to internal sides of the server rack 110. The rails 126 securely guide the server 106 in and out of the rack 110 by relative sliding motion of the server rail and the rack rail. Referring to FIGS. 1 and 4, the rack ears 124 are usually L-shaped and generally attach to the server 106 along the sides of the outer housing, and near a front face, of the server 106. A portion of the ears 124 extend outwardly from the front face of the server 106 and attach to a front portion of the rack 110 by bolts, or otherwise. In the embodiment of FIG. 4, the ID code is affixed to the portion of the rack ears 124 that are along the sides of the outer housing, near the front face, of the server 106. While the ID code is shown, in FIG. 4, on the rack ears 124, the exact position of the ID code is not intended to be limited to placement on the rack ears 124. The ID code may be positioned on the sides, the front face, a rear face, a top, or a bottom of the server 106.

Figure 3:
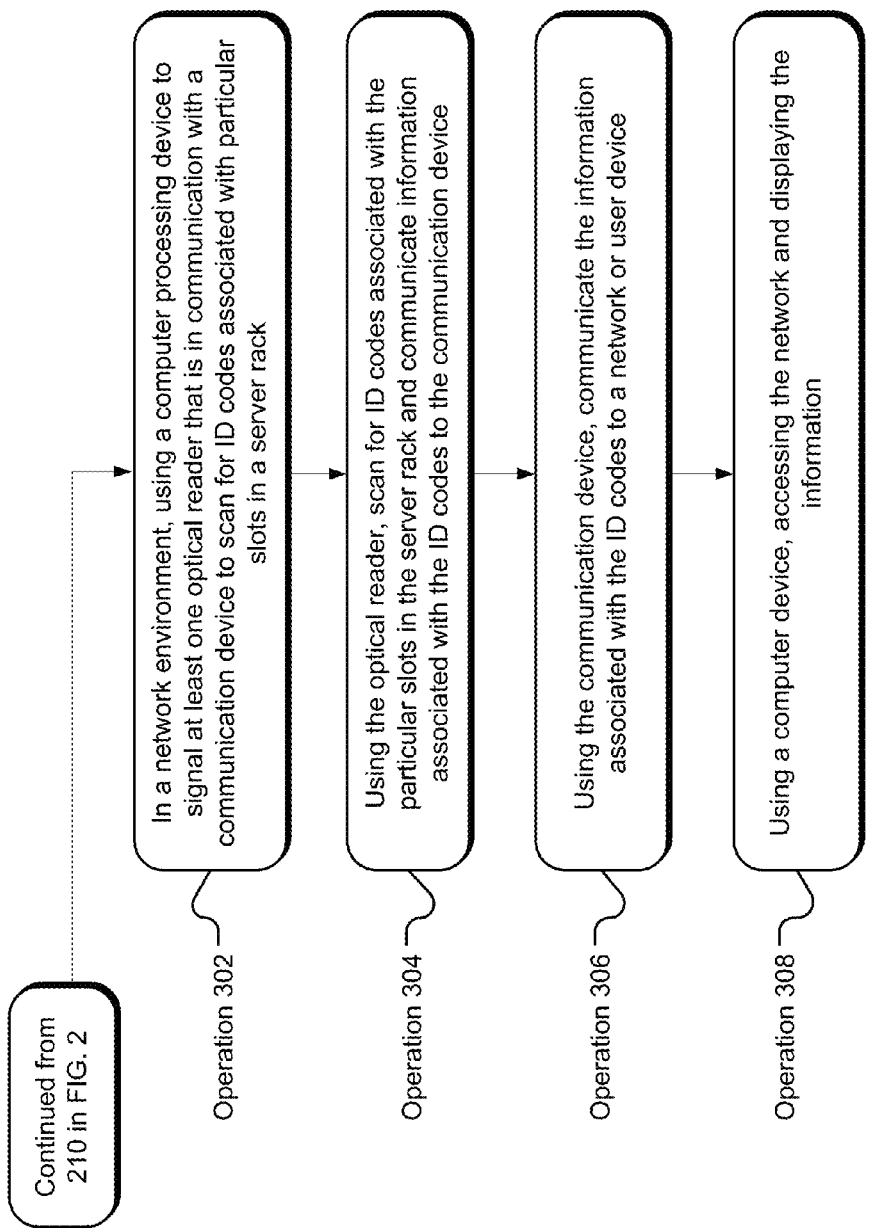

As detailed in FIGS. 2-4, a technician or engineer 122 installs 310 the server 106 with its affixed code 116 in a designated slot 112 in a serve rack 110 according to the location parameters as defined in the server identifying information 120 and as represented in the ID code 116 (operation 210). In a first embodiment, as depicted in FIG. 4, each slot 112 contains a reader 114, such as an optical reader, affixed to the rack 110 and positioned such that it is within scanning/reading range of the ID code 116 when the server 106 is installed in the rack 110. In the first embodiment, each reader 114 is positioned on the internal sides of the rack 110, just inside of a frontal opening of the rack 110 enclosure. In this particular embodiment, referring to FIG. 4, the ID code 116 is placed on the rack ears 124. While the ID codes may be placed in many different places, placement of the code 116 on the rack ears has the advantage that the codes 116 may be placed on the ears while the servers 106 remain in operation. In this way, codes 116 can be generated and applied to the rack ears 124 without having to remove the servers 106 from the rack 110. A technician 122 can partially slide a server 106 out of the rack 110 and replace a set of blank rack ears 124 with rack ears 124 with codes 116 affixed to them.

Once the server 106 is installed in a rack 110, a technician 122 may verify that the reader 114 that is affixed to the server rack 110 is properly aligned with the ID code 116 such that when the reader 114 scans for codes 116, the ID code 116 is appropriately read. The system 100 can include an audio cue, or other type of verification step, to aid in identifying a properly scanned code 116. If the system 100 does not properly read the ID code 116, the technician 122 may manually scan the code 116 to ensure that the code 116 is operable. If the code 116 is operable, the technician 122 can verify the correct placement of the code 116 relative to the reader 114 and realign the code 116 with the reader 114, if necessary. If the code 166 is still not read properly, the technician 114 may replace the code 116 or proceed to troubleshoot the reader 114.

Figure 5:
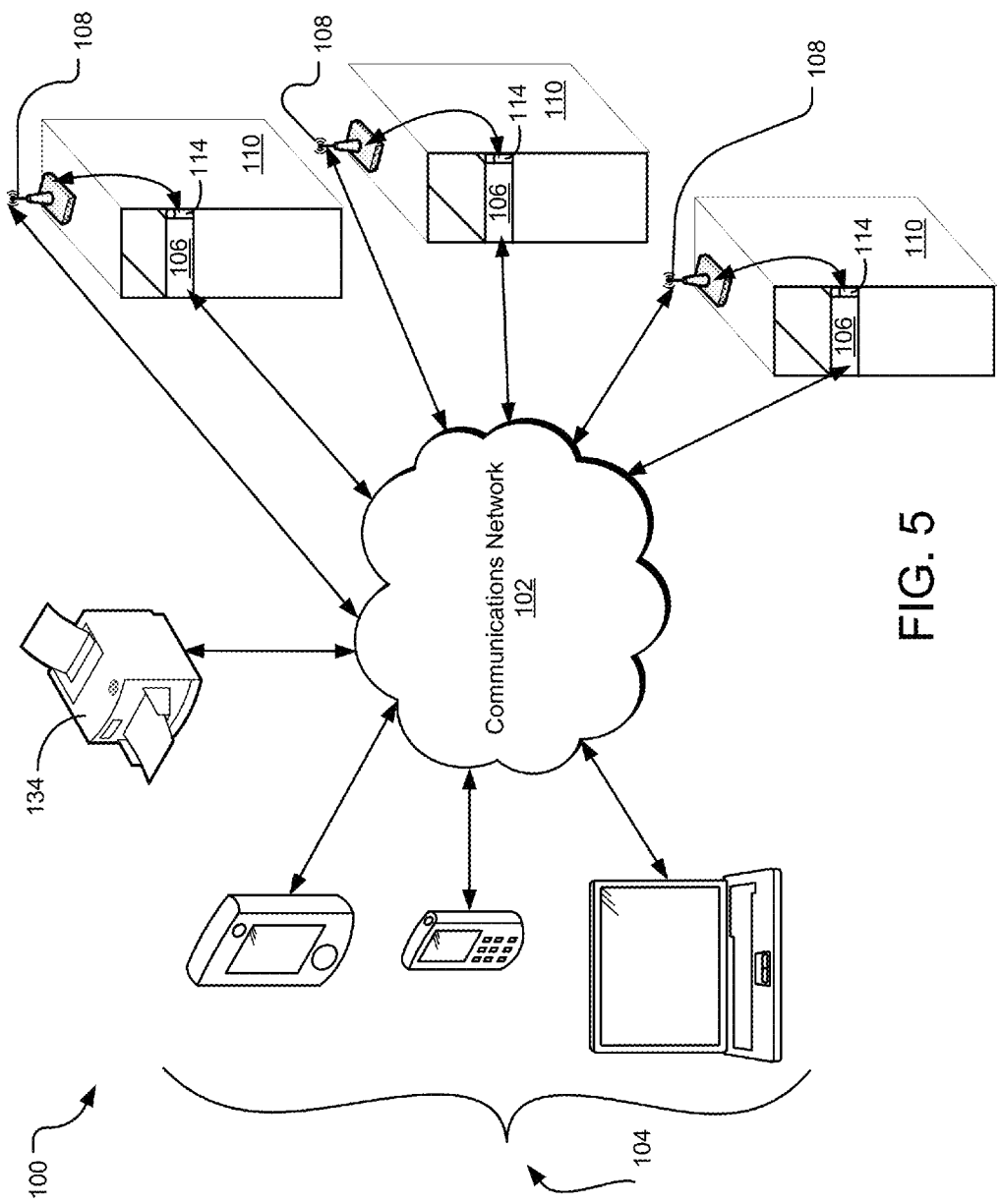
FIGS. 5-6 illustrate example network environments that may be useful in implementing a system and methods for locating and tracking data center equipment that is housed in server racks.

Referring to FIGS. 3-5, in response to a manual or automated command from a user device 104 within the network 102, the optical reader 114 scans for ID codes 116 associated with a server slot(s) 112 that is identified in the command (operation 302). The command signal may identify a single, multiple, or all readers 114 in the system 100. In a certain embodiment, the user device 104 may signal the optical reader 114 directly, whereas in a different embodiment, the user device 104 may signal a communication device 108, which in turn signals the optical reader 114. The communication device may be, for example, a server 106, a computer processing device, or similar device. Stated differently, the communication device 108 may act as an intermediary between the network 102 and the optical reader 114, thereby facilitating communications to and from both the network 102 and the optical reader 114. In response to the command from the user device 104, the optical reader 114 scans the associated server slots 112 for ID codes 116 and communicates the information 120 associated with each of the ID codes 116 to the communication device 108 or directly to the network 102 (operation 304). If the information 120 is routed through the communication device 108, it 108 in turn, communicates the information 120 associated with each of the ID codes 116 to a network device or user device 104 where the information may be displayed and/or analyzed (operation 306-308). Depending on the communication protocol of the devices and the particular restraints of the network environment, the reader 114 may communicate with the communication device 108 and/or the network 102 in a wired or wireless connection.

In the embodiment depicted in FIGS. 4-5, the communication device 108 may be contained within, on top of or within close proximity to the rack 110. The communication device 108 may receive signals from a user device 104 connected to the network 102 and communicate the signals to the optical reader 114. The communication device 108 may also receive scanned signal readings (i.e., information 120 in the ID code 116) from the reader(s) 114 and communicate the signals to another device, such as a user device 104, a server 106, a storage device, or otherwise, that is communicably connected to the network 102. As depicted in FIG. 5, each rack 110 may include a dedicated communication device 108 for each of the servers 106 in the rack 110. In this embodiment, a plurality of servers 106 within each rack 110 communicates with its respective communication device 108, and each of the devices 108 communicates with the network 102.

Figure 6:
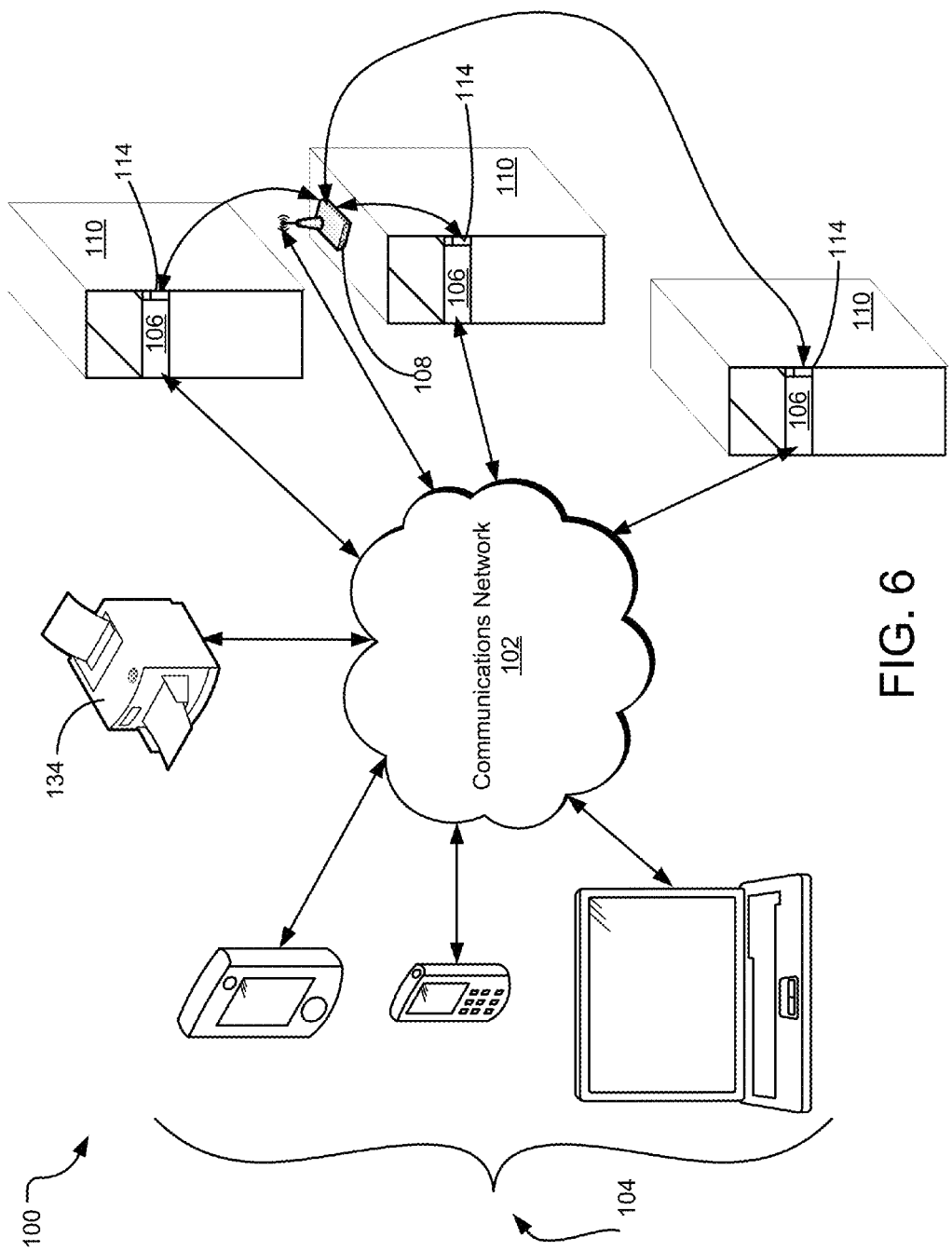
Figure 7:
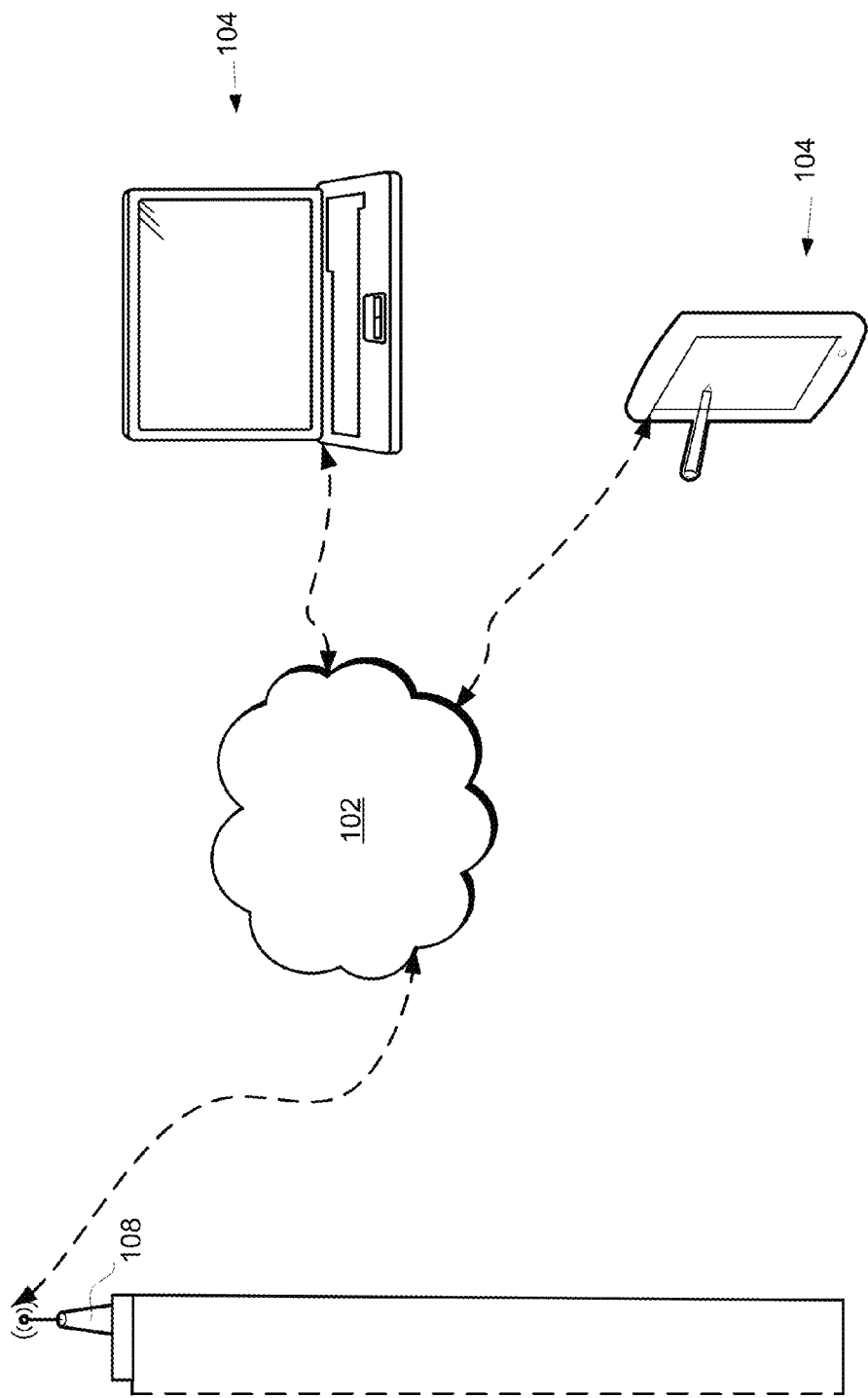
FIG. 7 illustrates a portion of the system and methods for locating and tracking data center equipment that is housed in server racks.

In another embodiment of the system 100, as depicted in FIG. 6, a centralized communication device 108 may receive signals from servers 106 in multiple racks 110. In this embodiment, the centralized device 108 communicates the information 120 from the plurality of servers 106 in multiple racks 110 to the network 102. Various other configurations are possible and may depend on the particular communication device 108 and protocol (e.g., Bluetooth IEEE 802.15.1, Wi-Fi IEEE 802.11, ultra-wideband IEEE 802.15.3, ZigBee IEEE 802.15.4) utilized in the network environment. As one non-limiting example, the communication device 108 may be a wireless device utilizing Bluetooth wireless communication protocol to communicate with the reader 114 and another device (e.g., server 106) that is connected to the network 102. In another example, applicable to the system 100 in FIG. 5 or 6, the communication device 108 may be a device that is wired to the reader 114 and the network 102. Suitable power for the communication device 108 can be supplied by the power that supplies the servers 106 to the rack 110.

In one implementation, the system 100 may have the readers 114 scan for codes 116 at reoccurring intervals (e.g., 30 minutes) in order to detect if a server 106 with a readable ID code 116 is positioned in a particular server slot 112. Alternatively, a user 122 may manually prompt the system 100 to scan a single, multiple, or all slots 112 in a particular server 106 or a particular data center. In either implementation, if any of the readers 114 detects/reads an ID code 116, the reader(s) communicate the information 120 associated with the code 116 (or the ID code 116 itself) to the communication device 108. The communication device 108 then communicates the code 116 to a device (e.g., server 106) that is connected to the network 102 where the information 120 may be displayed to a user 122 on a user device 104.

In one implementation, if a reader 114 does not detect an ID code 116, the reader 114 may signal the communication device 108 that no ID code 116 was detected. In another implementation, the reader 114 does not signal any information if it does not detect an ID code 116. Stated differently, the device (e.g., server 106) that receives the information 120 from the communication device(s) 108 can process the data received from the device(s) and indicate which slots 112 are empty and which slots 112 contain servers 106, as well as provide detailed information about each server 106. The processing of data can further include sorting, aggregating, or otherwise so that a clear picture of data center inventory can be obtained.

Figure 8:
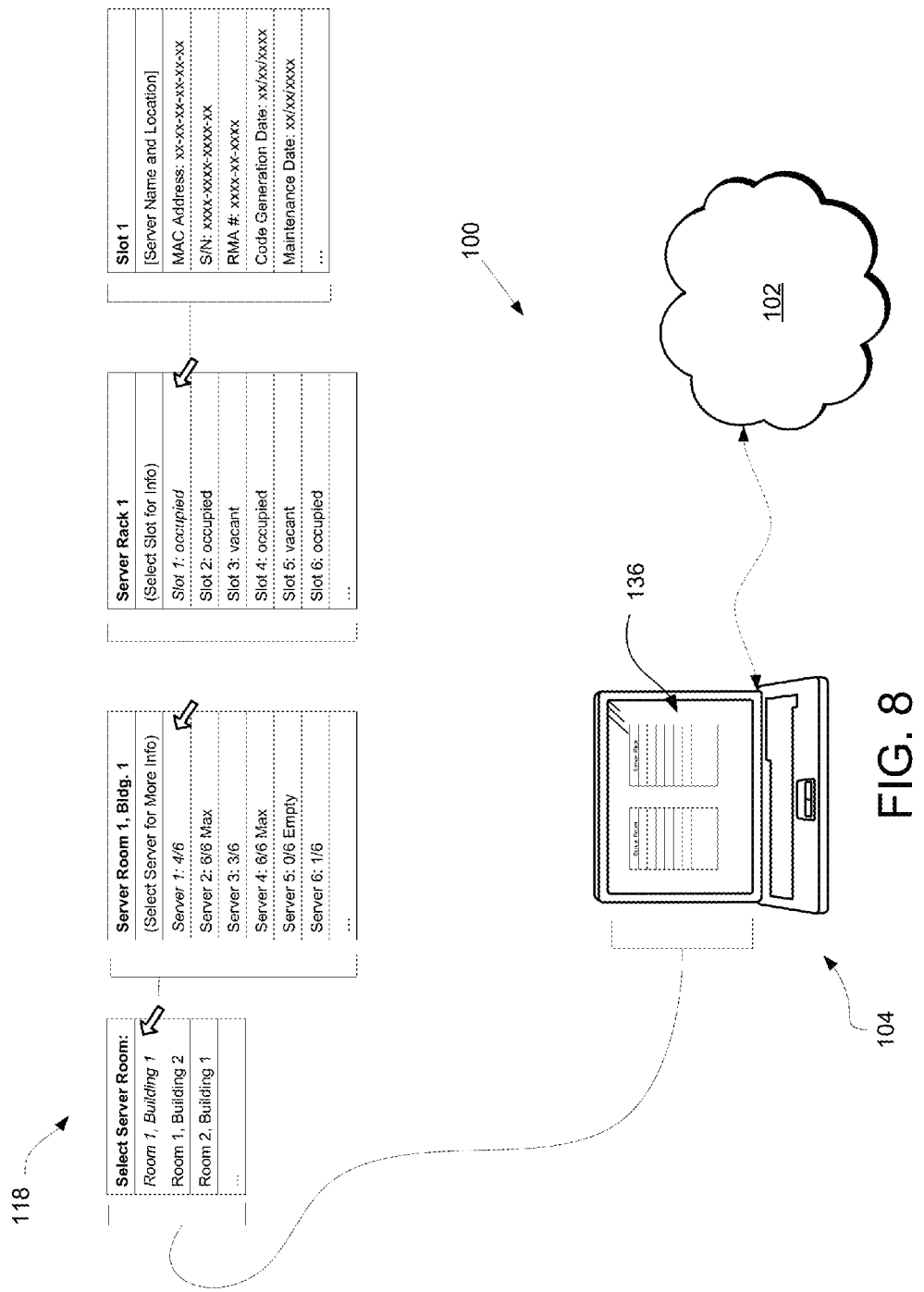
FIG. 8 illustrates a portion of a user interface for the system and methods for locating and tracking data center equipment that is housed in server racks.

As depicted in FIG. 8, a user device 104 may retrieve processed data 118 from the system 100 in order to evaluate the inventory in the data center. The processed data 118 is a processed form of the information 120 that was gathered from the optical reader 114 scans. Alternatively, a user device 104 may retrieve the (unfiltered) information 120 from the optical reader(s) 114 and process the data manually or automatically. The processed data 118 may be sorted and arranged in a hierarchical data structure that may be displayed via a graphical user interface ("GUI") 136, or otherwise. A user 122 may interact with the GUI 136 in order to view the location of a particular server 106 within a particular building, server room, server rack 110, and/or server slot 112. As illustrated in FIG. 8, a user can "drill down" (i.e., select a subset within a set) to the slot-level of each slot 112 in a server rack 110 by interacting with the GUI 136. By "drilling down" to subsequent fields in the GUI 136, a user 122 may obtain detailed information relating to an exact location of the server 106, the server specific information (e.g., factory serial number) and the server history (e.g., maintenance date(s)). As illustrated in FIG. 8, for example, a user 122 may select "Room 1, Building 1" from the "Select Server Room" screen interface. Selecting this set of data allows the user 122 to select a narrower subset of data within the "Server Room 1, Bldg. 1" screen interface. The interface may contain multiple subsets within each set and may continue into narrower and narrower sets of data. The processed data 118 can be used for not only locating a particular server 106, but for determining which server racks 110 are at capacity and which are not. Additionally, the information 120 can be used to locate a particular server 106 that has failed or is in need of maintenance. Alternative embodiments of the hierarchical structure of the GUI 136 are possible as well. For example, the processed data 118 may be sorted by maintenance date so that all servers 106 with a scheduled maintenance date on a certain date may be removed on the certain date, or otherwise.

Various modifications to the system 100 are possible depending on the particular needs or constraints in the network environment. For example, the ID code 116 may be alternatively affixed to the rack 110 and the reader 114 may be affixed to the server. An advantage to the code 116 being affixed to the server 106 is that by its very nature, the code 116 and the server 106 remain together with less chance of a server 106 and its corresponding code 116 dissociating from each other.

Figure 9:
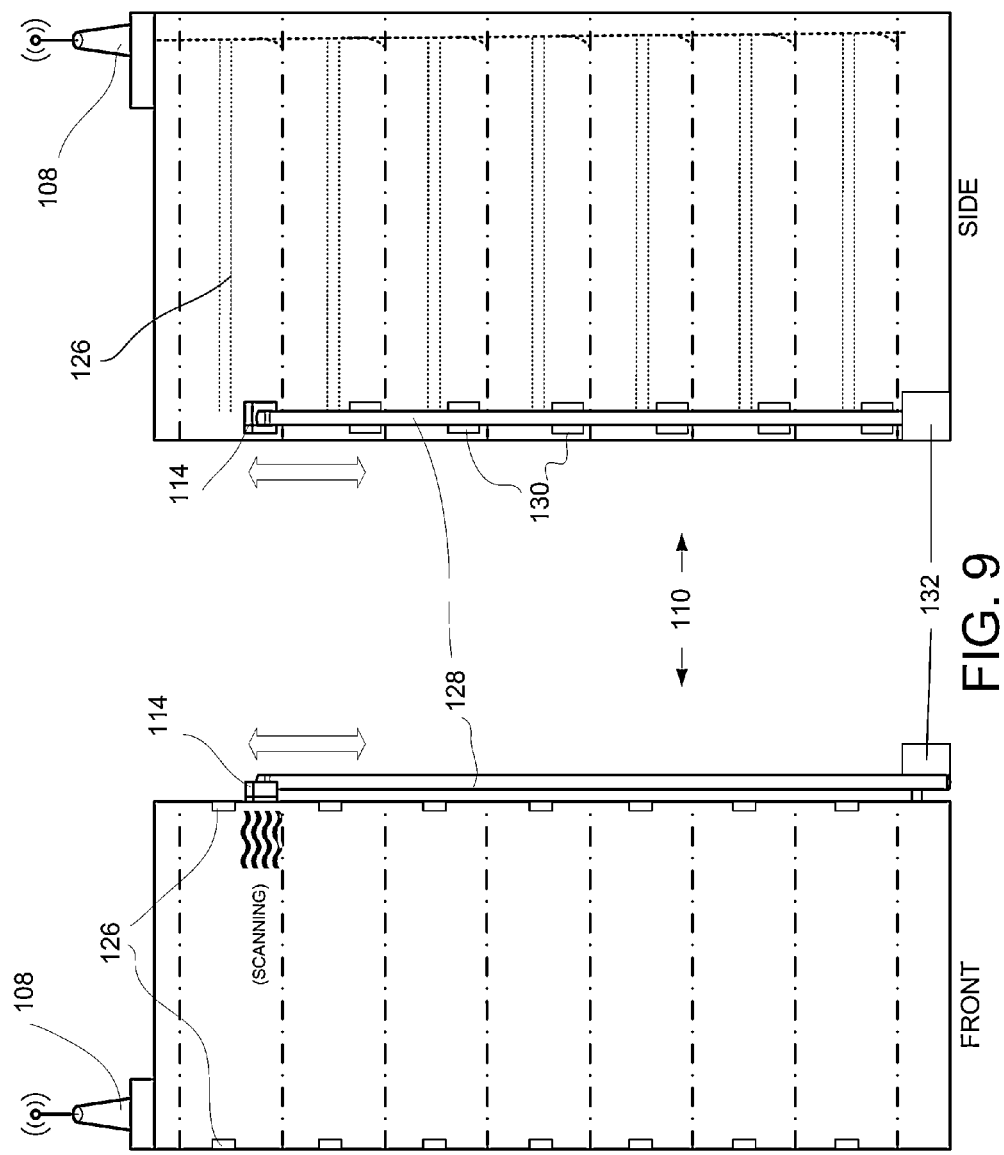
FIG. 9 illustrates an alternative embodiment of the system incorporating a moveable reader device.

In an alternative embodiment, as illustrated in FIG. 9, the system 100 includes a moveable reader that is coupled with a track system 128 (e.g, linear actuator), wherein a control system 132 is used in conjunction with the system 100 to control the vertical movement of the reader 114 relative to the rack 110. FIG. 9 depicts both front and side views of this particular embodiment, with guide rails 126 shown for reference, which engage with the rails 126 of rack mountable servers 106. The ID code 116 can be positioned on an outside portion of the housing of the rack 110, adjacent to each server (i.e., the ID code 116 is not affixed directly to the server 106) such that the reader 114 may scan/read the ID code 116. In an alternative embodiment where the ID code 116 is affixed to the server 106, the rack may include cutouts 130 through the housing of the rack 110 so that the reader 114 can scan the ID code 116 on the server 106 through the cutouts 130. Alternatively, if the rack 110 does not include walls (i.e., if the rack is not enclosed), then there would be no need for cutouts 130.

In a variation of the embodiment in FIG. 9, multiple individual readers 114 may be positioned on the track 128 so as to be coextensive with the cutouts 130. In this embodiment, the readers 114 would not need to be moveable, but would be stationary on the track 128 or on an internal portion of the rack 110. Other variations with respect to the reader 114 are possible and can be implemented based on the particular requirements of the network environment.

Turning to system's 100 network 102, FIG. 5 illustrates an example network environment that may be useful in implementing the system 100 and methods for locating and tracking server equipment in a data center environment. As depicted in FIG. 5, a communications network 102 (e.g., the Internet, LAN) is used by one or more computing or data storage devices for implementing the system 100 for locating and tracking server equipment in a data center environment. In one implementation, one or more user devices 104 are communicatively connected to the communications network 102. Examples of the user devices 104 include a personal computer, a lap top, a smart-phone, a tablet or slate (e.g., iPad), a multimedia console, a gaming console, a Personal Digital Assistant (PDA), a set top box, printer, etc. A user 122 may access the system 100 using the user devices 104. Users 122 may include, for example data center employees or technicians.

A server 106 hosts the system 100. In one implementation, the server 106 also hosts a website or an application that users visit to access the system 100. In one implementation, servers perform a variety of computing tasks (e.g., email, firewall). Individual servers 106 can be housed in racks 110 in order to centralize the network components and to efficiently utilize floor space in a data center. The server 106 may be one single server, a plurality of servers with each such server being a physical server or a virtual machine, or a collection of both physical servers and virtual machines. In one implementation, each server rack 110 includes a wireless communication device 108 that receives data from individual servers 106 within a rack 110. The communication device 108 can communicate with the network and send the data to other servers 106 for display of the data, storage, etc.

In another implementation, as depicted in FIG. 6, a centralized communication device 108 receives communications from servers 106 from multiple racks 110 and communicates the signal(s) to the network 102. In another implementation, a cloud hosts one or more components of the system 100. The user devices 104, the server 106, and other resources connected to the communications network 102 may access one or more other servers 106 for access to one or more websites, applications, web services interfaces, etc. that are used to locate and track server equipment in the data center. In one implementation, the server 106 also hosts a search engine that the system 100 uses for accessing and modifying information used to locate and track the equipment in the data center.

Figure 10:
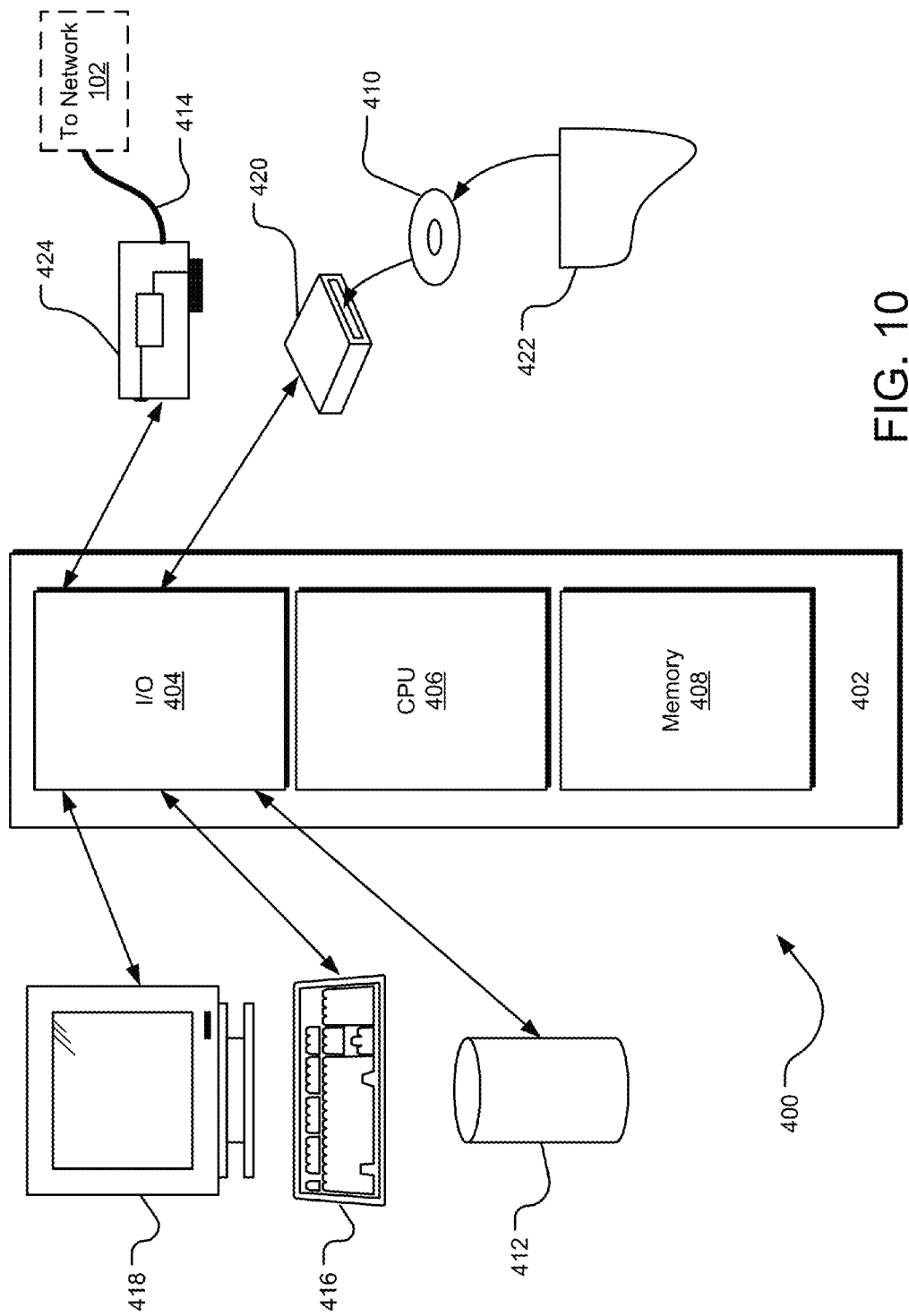
FIG. 10 illustrates an example computing system that may be useful in implementing the presently disclosed technology.

FIG. 10 illustrates an example computing system 400 that may be useful in implementing the presently disclosed technology. A general purpose computer system 400 is capable of executing a computer program product to execute a computer process. Data and program files may be input to the computer system 400, which reads the files and executes the programs therein. Some of the elements of a general purpose computer system 400 are shown in FIG. 10 wherein a processor 402 is shown having an input/output (I/O) section 404, a Central Processing Unit (CPU) 406, and a memory section 408. There may be one or more processors 402, such that the processor 402 of the computer system 400 comprises a single central-processing unit 406, or a plurality of processing units, commonly referred to as a parallel processing environment. The computer system 400 may be a conventional computer, a distributed computer, or any other type of computer, such as one or more external computers made available via a cloud computing architecture. The presently described technology is optionally implemented in software devices loaded in memory 408, stored on a configured DVD/CD-ROM 410 or storage unit 412, and/or communicated via a wired or wireless network link 414, thereby transforming the computer system 400 in FIG. 10 to a special purpose machine for implementing the described operations.

The I/O section 404 is connected to one or more user-interface devices (e.g., a keyboard 416 and a display unit 418), a disc storage unit 412, and a disc drive unit 420. Generally, the disc drive unit 420 is a DVD/CD-ROM drive unit capable of reading the DVD/CD-ROM medium 410, which typically contains programs and data 422. Computer program products containing mechanisms to effectuate the systems and methods in accordance with the presently described technology may reside in the memory section 404, on a disc storage unit 412, on the DVD/CD-ROM medium 410 of the computer system 400, or on external storage devices made available via a cloud computing architecture with such computer program products, including one or more database management products, web server products, application server products, and/or other additional software components. Alternatively, a disc drive unit 420 may be replaced or supplemented by a floppy drive unit, a tape drive unit, or other storage medium drive unit. The network adapter 424 is capable of connecting the computer system 400 to a network via the network link 414, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 400 is connected (by wired connection or wirelessly) to a local network through the network interface or adapter 424, which is one type of communications device. When used in a WAN-networking environment, the computer system 400 typically includes a modem, a network adapter, or any other type of communications device for establishing communications over the wide area network. In a networked environment, program modules depicted relative to the computer system 400 or portions thereof, may be stored in a remote memory storage device. It is appreciated that the network connections shown are examples of communications devices for and other means of establishing a communications link between the computers may be used.

In an example implementation, the computer system 400 is connected to the communication devices 108 via the communications network 102, as described herein. Data from a plurality of internal and external databases, source databases, and/or data cache on cloud servers are stored as the memory 408 or other storage systems, such as the disk storage unit 412 or the DVD/CD-ROM medium 410, and/or other external storage devices made available and accessible via a cloud computing architecture. Remote monitoring and management software and other modules and services may be embodied by instructions stored on such storage systems and executed by the processor 402. Some or all of the operations described herein may be performed by the processor 402. Further, local computing systems, remote data sources and/or services, and other associated logic represent firmware, hardware, and/or software configured to control the locating and tracking equipment system 100. Such services may be implemented using a general purpose computer and specialized software (such as a server executing service software), a special purpose computing system and specialized software (such as a mobile device or network appliance executing service software), or other computing configurations. In addition, one or more functionalities of the system 100 disclosed herein may be generated by the processor 402 and a user 122 may interact with a Graphical User Interface (GUI) 136 using one or more user-interface devices (e.g., the keyboard 416, the display unit 418, and the user devices 304) with some of the data in use directly coming from online sources and data stores.

The implementations described herein may be implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the presently disclosed technology. Accordingly, the logical operations making up the implementations of the presently disclosed technology described herein are referred to variously as operations, steps, objects, or modules. Furthermore, it should be understood that logical operations may be performed in any order, unless explicitly claimed otherwise or a specific order is inherently necessitated by the claim language. Furthermore, one or more portions of the various processes disclosed above may be implemented by software, hardware, firmware or combination thereof.

The above specification, examples, and data provide a complete description of the structure and use of example implementations of the technology. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

The invention claimed is:

1. A system for inventory management in a data center, the system comprising:

a server rack comprising a plurality of slots within the server rack, wherein each slot includes an optically readable identifying code affixed thereto, wherein the identifying code includes information associated with its respective slot location within the server rack;

at least one optical code reader positioned on affixed to a computer processing device and configured to scan the identifying code of the slot into which the computer processing device is placed and communicate the information associated with the slot location of the at least one computer processing device to a second computer processing device communicably coupled to a network and to the at least one code reader.

2. The system of claim 1, wherein the identifying code is a matrix barcode.

3. The system of claim 1, wherein the identifying code is a linear barcode.

4. The system of claim 1, wherein the identifying tag is an RFID tag.

5. The system of claim 2, wherein the code reader is an optical reader.

6. The system of claim 5, wherein the second computer processing device is wirelessly connected to the network.

7. The system of claim 6, wherein the second computer processing device utilizes one of the following wireless protocols: IEEE 802.15.1, IEEE 802.15.3, IEEE 802.15.4, or IEEE 802.11.

8. The system of claim 6, wherein the computer processing device comprises at least one server.

* * * * *